United States Patent [19]
Carlson

[11] 3,965,373
[45] June 22, 1976

[54] AUTOMATIC REFERENCE LEVEL ADJUSTMENT CIRCUIT

[75] Inventor: Paul A. Carlson, New Providence, N.J.

[73] Assignee: Wagner Electric Corporation, Parsippany, N.J.

[22] Filed: Nov. 4, 1974

[21] Appl. No.: 520,552

Related U.S. Application Data

[63] Continuation of Ser. No. 312,193, Dec. 4, 1972, abandoned.

[52] U.S. Cl. .............................. 307/264; 307/238; 307/246; 328/5; 328/168; 328/170; 340/52 E
[51] Int. Cl.² .................... H03B 3/02; G11C 27/02
[58] Field of Search ............... 328/1, 4, 5, 168, 170; 307/237, 264, 238, 246

[56] References Cited
UNITED STATES PATENTS

| | | | |
|---|---|---|---|
| 3,109,145 | 10/1963 | Morris et al. .......................... | 328/1 |
| 3,200,304 | 8/1965 | Atkins et al. ........................ | 328/5 X |
| 3,510,696 | 5/1970 | Bargen et al. ........................ | 328/1 X |
| 3,550,013 | 12/1970 | Gurol ................................. | 328/1 |
| 3,602,825 | 8/1971 | Senior ............................ | 307/264 X |
| 3,675,051 | 7/1972 | Mioduski ............................ | 328/5 X |
| 3,714,591 | 1/1973 | Allington ........................ | 307/264 X |
| 3,747,011 | 7/1973 | Buck .................................. | 328/5 X |
| 3,748,494 | 7/1973 | Nine ............................... | 307/237 X |
| 3,764,861 | 10/1973 | Orris .................................. | 328/5 X |

OTHER PUBLICATIONS

Millman and Taub, Pulse, Digital, and Switching Waveforms, McGraw-Hill, N..Y., 1965, pp. 28 and 38.

*Primary Examiner*—William D. Larkins
*Attorney, Agent, or Firm*—Eyre, Mann, Lucas & Just

[57] ABSTRACT

Circuitry operative to adjust the reference level of a sensing circuit by varying the energizing input to the sensing circuit inversely with respect to variations in the normal output of the sensing circuit. The adjustment circuit is preferably normally de-energized, and is operative to effect the desired adjustment to the energizing input of the sensing circuit within a fraction of a second after simultaneous energization and reception of a first input signal. The adjustment circuit is further operative upon receiving a second input signal to decrease the energizing input and thereby increase the sensitivity of the sensing circuit.

23 Claims, 1 Drawing Figure

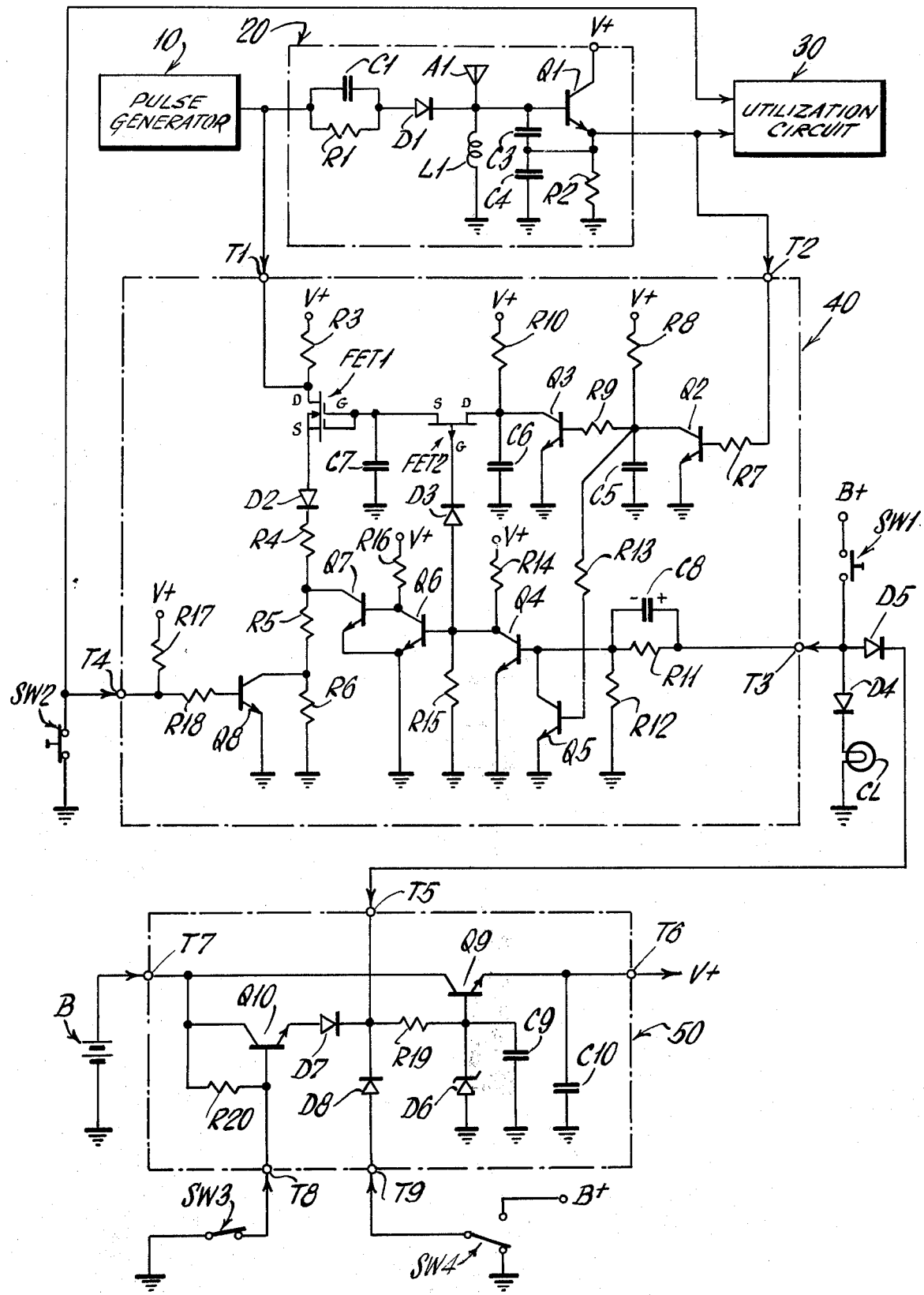

AUTOMATIC REFERENCE LEVEL ADJUSTMENT CIRCUIT

CROSS-REFERENCES TO RELATED APPLICATIONS

This is a continuation of copending U.S. Pat. application Ser. No. 312,193 entitled AUTOMATIC REFERENCE LEVEL ADJUSTMENT CIRCUIT filed on Dec. 4, 1972 in the name of Paul A. Carlson now abandoned.

The sensing circuit shown in the system disclosed herein is disclosed and claimed in U.S. Pat. No. 3,801,799 issued on Apr. 2, 1974 upon copending application Ser. No. 280,219 entitled CAPACITANCE AND RESISTANCE RESPONSIVE CONTROL CIRCUITS filed on Aug. 14, 1972 in the name of Carl E. Atkins. The utilization circuit shown in the system disclosed herein may comprise a signal-sequence control circuit of the type disclosed and claimed in U.S. Pat. No. 3,777,180 issued on Dec. 4, 1973 upon copending application Ser. No. 248,113 entitled SIGNAL-SEQUENCE CONTROL CIRCUIT filed on Apr. 27, 1972 in the name of Paul A. Carlson. The present invention may be advantageously incorporated into the system disclosed and claimed in U.S. Pat. No. 3,798,551 issued on Mar. 19, 1974 upon copending application Ser. No. 289,573 entitled MULTIPLEXED SIGNAL-SEQUENCE CONTROL SYSTEM filed on Sept. 15, 1972 in the name of Arthur F. Cake.

BACKGROUND OF THE INVENTION

The present invention relates to circuitry which is operative to adjust the energizing input of a sensing circuit in order to stabilize the normal output of the sensing circuit. In this manner, adjustment of the sensing circuit reference level is carried out so as to compensate for drift in component values and changing ambient conditions which would cause fluctuations in the normal output of the sensing circuit. The adjustment circuit disclosed herein is preferably normally de-energized, and is capable of making the necessary adjustment to the sensing circuit input within a fraction of a second after being simultaneously energized and receiving a first input signal. Energization of the adjustment circuit is effected by a voltage regulation circuit which is normally inoperative to provide a regulated output voltage. Thus, standby power dissipation is minimized. The system disclosed herein may be employed, for example, in an automotive vehicle as a warning circuit operative to provide a signal when a seat is occupied but the associated seat belt is not buckled.

SUMMARY OF THE INVENTION

The present invention is embodied in and carried out by a reference level adjustment circuit which receives the normal output signal of a sensing circuit and, upon receiving a first input signal, responds thereto by increasing or decreasing the energizing input to the sensing circuit so as to stabilize the normal output signal of the sensing circuit. The adjustment circuit may be further operative in response to the first input signal to intermediately alter the energizing input to the sensing circuit so as to decrease the sensitivity of the sensing circuit, and in response to a second input signal to subsequently alter the energizing input to the sensing circuit so as to increase the sensitivity of the sensing circuit. If the output signal of the sensing circuit is abnormal, the adjustment circuit is disabled from effecting any change in the energizing input to the sensing circuit in response to said first input signal. Optionally, the adjustment circuit is initially energized by a voltage regulation circuit only when an adjustment of the reference level of the sensing circuit is to be effected.

BRIEF DESCRIPTION OF THE DRAWING

The present invention may be better understood by reading the written description thereof with reference to the accompanying drawing, which is a circuit diagram of a system incorporating applicant's novel adjustment circuit and the associated voltage regulation circuit.

DESCRIPTION OF THE PREFERRED EMBODIMENT

Referring now to the drawing, the system shown will be described in relation to the aforementioned automotive application, i.e., operating as a warning system which provides a signal when a seat is occupied but the associated safety belt is not buckled. In this system, pulse generator 10 is operative to feed a continuous pulse train to the input of sensing circuit 20, the output of which is fed to the utilization circuit 30. A switch SW2 is incorporated into the seat belt buckle associated with the seat which the system is monitoring. Switch SW2 is normally closed, and is opened when the seat belt buckle is coupled to the seat belt latch. Normally, the output of sensing circuit 20 normally consists intermittent an intermitent DC voltage with a high-frequency oscillatory voltage when antenna A1 is not capacitively or ohmically coupled to a resistive or capacitive impedance in the form of a human occupant of the associated seat, for example. Each pulse from pulse generator 10 passes through the bias network formed by capacitance C1 and resistance R1 and through diode D1 with minimal attenuation to the tuned circuit comprising inductance L1, capacitances C3 and C4, and whatever impedance is coupled to antenna A1. During each interpulse null, this tuned circuit oscillates or rings at its natural frequency, and these oscillations drive the enhancing circuit formed by transistor Q1, capacitances C3 and C4, and resistance R2 into conductivity. If a resistive load is capacitively or ohmically coupled to the tuned circuit by antenna A1, the oscillations in the tuned circuit are severely damped, and as a result, the enhancing circuit is not rendered conductive. Under these circumstances, the output of sensing circuit 20 drops to near ground potential. Thus, the normal output of sensing circuit 20 is a pulsating DC voltage with a high-frequency oscillatory component superimposed thereon, and when a resistive load is coupled to the tuned circuit by antenna A1, the output of sensing circuit 20 is essentially a constant null.

Adjustment circuit 40 is connected to the input of sensing circuit 20 at terminal T1, which is coupled to the junction of resistance R3 and the drain electrode of metal-oxide semiconductor field-effect transistor FET 1. The series combination of resistance R3, FET 1, diode D2, and resistances R4, R5 and R6 form a voltage divider, with FET 1 acting as a variable resistance controlled by the voltage on its gate electrode. The function of diode D2 is to enable the voltage at the gate electrode G to go below the voltage at the source electrode of FET 1. This is accomplished by maintaining the source electrode S at a slightly positive voltage even when there is extremely low level current flow through the series circuit comprising resistance R3, the drain-source electrodes of FET 1, diode D2 and resistances R4, R5 and R6. Under these circumstances, diode D2 in effect acts as a small source of electromotive force having a small resistance connected in series therewith by virtue of the knee at the lower end of its voltage-current characteristic curve. Thus, even at a very low level of current, approximately +0.7 volts will be developed at the anode of D2. This enables FET 1 to have a wider range of drain-to-source conductivity at the lower end, i.e., the FET 1 may be driven more non-conductive than would be possible without the biasing diode D2.

The output of sensing circuit 20 is applied to input terminal T2 of adjustment circuit 40, and is fed through resistance R7 to the base of transistor Q2. Thus, the degree of conductivity of Q2 is controlled by the magnitude of the DC component of the normal output signal of sensing circuit 20; the high-frequency component is filtered to ground through capacitance C5 connected across the output of Q2. The more conductive Q2 becomes, the smaller the DC voltage across capacitance capacitance C5, since charging current flowing through resistance R8 is increasingly diverted through the collector-emitter terminals of transistor Q2 with increasing conductivity of that transistor. The inversely variable DC voltage thus derived at the junction of R8 and C5 is applied through resistance R9 to the base of transistor Q3, thereby controlling the degree of conductivity of that transistor. Thus, the variable DC voltage across capacitance C6 is controlled by the degree of conductivity across the collector-emitter terminals of transistor Q3 in the same manner that Q2 controls the variable DC voltage across capacitance C5. When the positive voltage normally applied to the gate electrode of junction field effect transistor FET 2 is reduced to ground potential, the voltage across capacitance C6 which is applied to the drain electrode D of FET 2 will be transferred to the source electrode S, thereby charging capacitance C7 to place a positive voltage on the gate electrode of FET 1, thereby altering the conductivity across its drain and source electrodes. When FET 2 returns to its non-conductive state, capacitance C7 will be prevented from discharging since both FETs 1 and 2 present an extremely high impedance to C7.

When the normally-open vehicle door switch SW1 is momentarily closed, thereby energizing courtesy lamp CL through diode D4, another input voltage is applied to input terminal T3 of adjustment circuit 40. This voltage causes a transient current to flow through normally-uncharged capacitance C8 to the base of the transistor Q4, thereby charging C8 and rendering Q4 momentarily conductive. The values of resistances R11 and R12 are such that the steady-state voltage developed at their junction is insufficient to render Q4 conductive when SW1 is closed. Similarly, the values of R14 and R12 are such that the transistor Q4 is non-conductive when SW1 is open.

At this point, it should be noted that transistor Q5, the collector-emitter junction of which is connected in parallel with the base-emitter terminals of Q4, is normally insufficiently conductive to prevent the turn-on of Q4 by the application of B+ through switch SW1 and the network formed by capacitance C8 and resistance R11. However, if the output of sensing circuit 20 is low at the time switch SW1 is closed, thereby indicating the presence of a person in a seat in the vehicle when the door is opened by another person, Q2 will be non-conductive and the voltage on capacitance C5 will be high. This voltage is applied through resistance R13 to the base of transistor Q5 to render same conductive, thereby preventing Q4 from becoming conductive and switching FET 2 to a high-conductivity state.

When the collector of Q4 momentarily goes low as a result of the transient current which also charges C8, FET 2 will be momentarily switched from a non-conductive state to a highly-conductive state, thereby transferring the voltage on capacitance C6 across drain and source electrodes of FET 2 to capacitance C7. The voltage thus impressed across storage capacitance C7 will be retained until FET 2 is again switched conductive to vary the voltage on C7 according to the voltage which appears on C6 at the time FET 2 is momentarily switched on.

The low voltage at the collector of Q4 which is applied through diode D3 to the gate electrode of FET 2 to switch FET 2 conductive is also applied to the base of transistor Q6, which is consequently rendered non-conductive, thereby causing cascaded transistor Q7 to become conductive. Thus, resistances R5 and R6 are shunted out of the voltage divider combination during the adjustment of the voltage at gate electrode G of FET 1. When the voltage at the collector of Q4 returns to its normally high value, resistances R5 and R6 are again placed in the voltage divider circuit to decrease the sensitivity of the closely-adjusted sensing circuit 20 by increasing the energizing input thereto. When normally-closed buckle switch SW2 is opened by buckling the associated seat belt buckle, the base of transistor Q8 is taken off ground, and turn-on current flows through resistances R17 and R18 across the base-emitter junction of Q8 to render transistor conductive. Thus, the sensitivity of sensing circuit 20 is slightly increased by decreasing the energizing input to sensing circuit 20 by a smaller increment than it was increased by the shunting of R5 and R6 during adjustment of drain-to-source conductivity of FET 1 and subsequent insertion of R5 and R6 into the voltage divider.

Although adjustment circuit 40 may be normally energized by the application of regulated voltage V+ (approximately +10 volts DC), in many applications it is desirable for the purpose of conserving stored electrical power to energize the circuit only when an adjustment of sensing circuit 20 should be made. To accomplish this, voltage regulation circuit 50 is normally inoperative to provide the regulated output voltage V+ to those terminals so labeled in adjustment circuit 40. Voltage regulation circuit 50 is controlled by door courtesy lamp switch SW1, seat belt reel switch SW3, and ignition switch SW4. When switch SW1 is closed, unregulated battery voltage B+ is applied through diode D5, input terminal T5, and resistance R19 to the cathode of zener diode D7, which breaks down and develops a substantially constant voltage at the junction of its cathode and parallel-connected capacitance C9. This constant voltage is applied to the base of transistor Q9 to fix the degree of conductivity between its collector-emitter terminals. Since the positive terminal of battery B is connected through terminal T7 to the collector of Q9, a predetermined, regulated voltage V+ is derived at the junction of the emitter of transistor Q9 and capacitance C10. This voltage V+ is fed through output terminal T6 to adjustment circuit 40, so long as switch SW1 is closed.

When the door courtesy light switch SW1 is reopened upon the closing of the associated door, the voltage regulation circuit 50 ceases to produce the regulated output V+. However, adjustment circuit 40 has completed its operation within a fraction of a second after the switch SW1 was closed. Therefore, by the time the person entering the vehicle has occupied the seat associated with the system, the necessary compensation for ambient conditions and circuit component value variations has been made. After the seat occupant closes the door by which he entered the vehicle, he should buckle his seat belt as a safety measure before operating the vehicle. If he does so, seat belt reel switch SW3 will first be opened, thereby opening the current path from terminal T8 of voltage regulation circuit 50 through SW3 to ground. Consequently, the current which traversed this path while SW3 was closed will now flow through battery B through resistance R7, sensing circuit 20, across the base-emitter junction of transistor Q10, diode D7, and resistance R19 through zener diode D6, because the voltage at the cathode of D6 will rise above the zener breakdown level with the opening of SW3. Thus, a substantially constant voltage is again impressed on the base of transistor Q9 to fix the degree of conductivity between its collector-emitter terminals. As before, a predetermined regulated voltage V+ will consequently be generated at the junction of the emitter of transistor Q9, and the sensing circuit 20 and adjustment circuit 40 will again be energized.

When the occupant closes his seat belt buckle, normally-closed switch SW2 is opened, thereby opening a path through resistance R17 through terminal T4 and SW2 to ground. Consequently, current will now flow through resistances R17 and R18 and across the base-emitter junction of transistor Q8, thereby turning on Q8 and shorting resistance R6 out of the voltage divider circuit formed by resistances R3, R4, R5 and R6 and FET 1 and diode D2. This has the effect of reducing energizing input from pulse generator 10, sensing circuit 20, and thereby enhancing the sensitivity of sensing circuit 20.

When the occupant activates ignition switch SW4, the battery B is connected through SW4 and terminal T9 to provide a parallel activating signal to voltage regulation circuit 50. Thus, if the occupant unbuckles his seat belt and allows the belt to be taken up by the associated reel, both switches SW2 and SW3 will again close. The closing of SW3 will not prevent voltage regulation circuit 50 from generating the regulated output V+, since the application of B+ through SW4 and terminal T9, diode D8 and resistance R19 causes zener diode D6 to remain broken down, thereby applying the necessary voltage to the base of Q9 to enable generation of V+. Thus, the sensing circuit 20 will be maintained operative to detect the presence of the occupant in the associated seat. The signal generated by sensing circuit 20 in combination with the open seat belt buckle switch SW2 will cause utilization circuit 30 to generate a warning signal.

In the system incorporating applicant's novel adjustment circuit, the circuit values of the various components are as follows:

Resistances
R1 - 1K ohm
R2 - 1K
R3 - 300 ohms
R4 - 220
R5 - 68
R6 - 68
R7 - 100
R8 - 33K
R9 - 1 Megohm
R10 - 10K ohms
R11 - 22K
R12 - 1K
R13 - 10K
R14 - 1K
R15 - 10K
R16 - 1K
R17 - 1 Megohm
R18 - 10K
R19 - 1K
R20 - 10K Capacitances
C1 - .22 microfarads
C2 - none
C3 - 39 picofarads
C4 - 150 picofarads
C5 - 0.22 microfarads
C6 - 0.22 microfarads
C7 - 0.22 microfarads
C8 - 30 microfarads
C9 - .1 microfarads
C10 - 80 microfarads Inductance L1 - 33 microhenries Diodes D1 - 1N5060
D2 - 1N5060
D3 - 1N4148
D4 - 1N5060
D5 - 1N5060
D6 - 10 volt zener
D7 - 1N5060
D8 - 1N5060

Transistors

Q1 - 2N5132
Q2 - 2N5132
Q3 - 2N5132
Q4 - 2N5132
Q5 - 2N5132
Q6 - 2N5132
Q7 - 2N5132
Q8 - 2N5132
Q9 - 2N3567
Q10 - 2N3567
FET 1 - RCA 40841
FET 2 - Motorola 2N4342

The advantages of the present invention, as well as certain changes and modifications of the disclosed embodiment thereof, will be readily apparent to those skilled in the art. For example, the adjustment circuit disclosed herein may be employed to regulate either direct current or alternating current voltages, in addition to a pulsating output as described herein. The adjustment circuit may be employed in a rudimentary form by eliminating either the de-sensitizing circuit comprising transistors Q6 and Q7, or the sensing circuit comprising transistor Q8, or both. The disabling circuit formed by resistance R13 and transistor Q5 may also be eliminated in applications in which such a function is not necessary or desirable. It is the applicant's intention to cover all those changes and modifications which could be made to the embodiment of the invention herein chosen for the purposes of the disclosure without departing from the spirit and scope of the invention.

What is claimed is:

1. In a system comprising sensing circuit means for monitoring at least one parameter normally operative to provide a first output signal and operative in response to a predetermined minimum change in at least one monitored parameter to provide a second output signal, and energizing means operative to provide an energizing input to said sensing circuit means, the improvement comprising:

adjustment circuit means operative to receive said energizing input, said first and second output signals, and a first input signal from first circuit means for actuating said adjustment circuit means, said first circuit means being separate from said sensor circuit means, and operative in response to said first input signal to adjust the energizing input to the sensing circuit means so as to adjust the first output signal of the sensing circuit means to a substantially constant level.

2. The improvement according to claim 1 wherein said adjustment circuit means is further operative in response to said first input signal (a) to decrease the magnitude of the energizing input to the sensing circuit means during adjustment to the energizing input, and (b) to increase the magnitude of the energizing input to the sensing circuit means after adjustment of the energizing input so as to decrease the sensitivity of said sensing circuit means.

3. The improvement according to claim 1 wherein said adjustment circuit means is further operative in response to a second input signal to decrease the magnitude of the energizing input to said sensing circuit means so as to increase the sensitivity of said sensing circuit means.

4. The improvement according to claim 1 wherein said adjustment circuit means is further operative in response to said second output signal of said sensing circuit means to prevent adjustment of said energizing input to said sensing circuit means.

5. The improvement according to claim 1 wherein said adjustment circuit means comprises:
  1. voltage signal circuit means operative to receive the output of said sensing circuit means and to develop a voltage signal directly proportional to at least one component of the output of said sensing circuit means;
  2. memory circuit means operative, when actuated, to receive and store the instantaneous value of said voltage signal developed by said voltage signal circuit means;
  3. voltage divider means operative to adjust said energizing input to said sensing circuit means, said voltage divider means comprising a plurality of resistances, at least one of which is a voltage-variable resistance operative to receive the voltage stored in said memory circuit means; and
  4. trigger circuit means operative to receive said first input signal and, in response thereto, to actuate said memory circuit means to store said voltage signal developed by said voltage signal circuit means.

6. The improvement according to claim 5 wherein said adjustment circuit means further comprises de-sensitizing circuit means operative to shut first and second resistances of said voltage divider means only during actuation of said memory circuit means.

7. The improvement according to claim 6 wherein said adjustment circuit means further comprises sensitizing circuit means operative to shunt said second resistance of said voltage divider means in response to a second input signal.

8. The improvement according to claim 5 wherein said voltage-variable resistance in said voltage divider means is a first field-effect transistor having gate, source and drain electrodes.

9. The improvement according to claim 8 wherein said memory circuit means comprises:
  1. a second field-effect transistor having gate, source and drain electrodes, said gate electrode of said first field-effect transistor being directly connected to said source electrode of said second field-effect transistor; and
  2. a memory capacitance connected to the junction of said gate electrode of said first field-effect transistor and said source electrode of said second field-effect transistor.

10. The improvement according to claim 9 wherein said trigger circuit means comprises:
  1. RC input network means operative to enable momentary peaking of input current to said trigger circuit means in response to said first input signal;
  2. switching means operative momentarily to change conductivity state in response to said first input signal applied through said RC input network means; and
  3. an output network coupled between said switching means and said gate electrode of said second field-effect transistor to apply an actuating signal thereto in response to a momentary change in conductivity state of said switching means.

11. The improvement according to claim 10 wherein said adjustment circuit means further comprises disabling circuit means connected between said voltage signal circuit means and said trigger circuit means, and operative in response to said second output signal of said sensing circuit means to shunt the input of said switching means.

12. The improvement according to claim 10 wherein said adjustment circuit means further comprises a cascaded transistor means operative to receive the output of said trigger circuit means and, in response thereto, to shunt first and second resistances of said voltage divider means.

13. The improvement according to claim 12 wherein the input of said cascaded transistor means is coupled to said output network of said trigger circuit means.

14. The improvement according to claim 12 wherein said adjustment circuit means further comprises normally-non-conductive transistor means operative in response to a second input signal to shunt said second resistance of said voltage divider means.

15. An adjustment circuit comprising:
  1. voltage signal circuit means operative to receive a first signal from the output of an associated circuit and to develop a voltage signal directly proportional to at least one component of said first signal;
  2. memory circuit means operative when actuated, to receive and store the instantaneous value of said voltage signal developed by said voltage signal circuit means;
  3. voltage divider means operative to adjust the input to said associated circuit, said voltage divider means comprising a plurality of resistances, at least one of which is a voltage-variable resistance operative to receive the voltage stored in said memory circuit means;
  4. trigger circuit means operative to receive a second signal and, in response thereto, to actuate memory circuit means to store said voltage signal developed by said voltage storage circuit means; and
  5. de-sensitizing circuit means operative to shunt first and second resistances of said voltage divider means during actuation of said memory circuit means.

16. The adjustment circuit according to claim 15 further comprising sensitizing circuit means operative to shunt said second resistance of said voltage divider means in response to a third signal.

17. The adjustment circuit according to claim 15 wherein said voltage-variable resistance in said voltage divider means is a first field-effect transistor having gate, source and drain electrodes.

18. The adjustment circuit according to claim 17 wherein said memory circuit means comprises:
  1. a second field-effect transistor having gate, source and drain electrodes, said gate electrode of said first field-effect transistor being directly connected to said source electrode of said second field-effect transistor; and
  2. a memory capacitance connected to the junction of said gate electrode of said first field-effect transistor and said source electrode of said second field-effect transistor.

19. The adjustment circuit according to claim 18 wherein said trigger circuit means comprises:
1. RC input network means operative to enable momentary peaking of input current to said trigger circuit means in response to said second signal;
2. switching means operative momentarily to change conductivity state in response to said second signal applied through said RC input network means; and
3. an output network coupled between said switching means and said gate electrode of said second field-effect transistor to apply an actuating signal thereto in response to a momentary change in conductivity state of said switching means.

20. The adjustment circuit according to claim 19 further comprising disabling circuit means connected between said voltage signal circuit means and said trigger circuit means, and operative in response to a predetermined output signal of said associated circuit means to shunt the input of said switching means.

21. The adjustment circuit according to claim 19 further comprising a cascaded transistor means operative to receive the output of said trigger circuit means and, in response thereto, to shunt first and second resistances of said voltage divider means.

22. The adjustment circuit according to claim 21 wherein the input of said cascaded transistor means is coupled to said output network of said trigger circuit means.

23. The adjustment circuit according to claim 21 further comprising normally-non-conductive transistor means operative in response to a third signal to shunt said second resistance of said voltage divider means.

* * * * *